United States Patent [19]

Bainbridge

[11] 4,082,669
[45] Apr. 4, 1978

[54] SEPARATOR OF OIL AND WATER

[75] Inventor: Cuthbert Angus Bainbridge, Birmingham, England

[73] Assignee: Barton Hydraulic Engineering Company Limited, Birmingham, England

[21] Appl. No.: 702,464

[22] Filed: Jul. 6, 1976

[51] Int. Cl.² .............................................. B01D 21/00
[52] U.S. Cl. ................................... 210/184; 210/187; 210/306; 210/316; 210/540
[58] Field of Search ......... 210/153, 187, 188, DIG. 5, 210/307, 521, 522, 306, 316, 540; 55/171, 172, 173, 174, 175

[56] References Cited

U.S. PATENT DOCUMENTS

| | | | |
|---|---|---|---|
| 2,181,684 | 11/1939 | Walker | 210/521 X |
| 2,214,248 | 9/1940 | Hawley | 210/DIG. 5 |
| 2,601,904 | 7/1952 | Erwin | 210/187 |
| 2,713,919 | 7/1955 | Walker et al. | 210/187 X |
| 3,199,676 | 8/1965 | May | 210/307 X |
| 3,450,264 | 6/1969 | Graybill | 210/521 X |
| 3,510,006 | 5/1970 | Cheysson | 210/522 |
| 3,651,944 | 3/1972 | Shuttleworth | 210/304 |
| 3,948,767 | 4/1976 | Chapman | 210/307 |

Primary Examiner—Theodore A. Granger
Attorney, Agent, or Firm—Scrivener, Parker, Scrivener & Clarke

[57] ABSTRACT

In a separator for oil and water, successive separating stages are located within concentric chambers in a vertical cylindrical container, each chamber having at its upper end a collecting zone for separated oil, and the stages comprise respectively a first stage incorporating a plurality of concentric annular shells of which at least portions are inclined to the vertical and which are located within an open-ended annular chamber through which liquid flows in an upward direction, a second stage comprising a coagulator through which liquid from the first stage is directed upwardly, and a third stage comprising a filter housed within a cylindrical screen located above the coagulator.

5 Claims, 2 Drawing Figures

SEPARATOR OF OIL AND WATER

This invention relates to an improved separator of oil and water. However it is to be understood that, although the invention is described with particular reference to the separation of oil and water mixes, it may equally be applied to the separation of any two immiscible liquids of differing densities.

On ships ballast water and bilge water, which are to be discharged, are often contaminated with oil. It is an offense to discharge oil into harbour or coastal waters and, in order to meet increasingly strict regulations relating to maximum oil content of discharged waters, separators of improved efficiency are, required to treat such waters before discharging them. Similar regulations must be complied with in respect of waste waters from industrial processes which are discharged into storm water sewers or directly into rivers.

Our invention comprises a separator for oil and water incorporating three separating stages through which oil and water mixture to be separated successively flows, the first stage comprising a series of plates over which the mixture flows in an upward direction and which, or portions of which, are inclined to the vertical, the second stage comprising a coagulator through which water and any oil not separated in the first stage flows in an upward direction, and the third stage comprising a screen which is fine enough to remove from water leaving the second stage oil of molecular fineness and which, when in use, is vertical or substantially vertical.

Oil separated in the various stages collects in zones from which it can be removed, the clear water finally leaving the upper end of the separator.

In the first stage, oil in the mixture, being of lower specific gravity than the water floats up towards the inclined surfaces of the plates and gathers on these surfaces. The oil forms climbing films on the surfaces and these films move upwardly to the upper edges of the plates under the influence of the buoyancy of the oil and form agglomerates there. When the agglomerates are big enough for their buoyancy to overcome the surface tension forces holding them to the plates they break away and float upwardly in the water to a collecting zone.

In the second stage oil remaining in the water collects on the material in the coagulator bed which comprises finely divided material having a greater affinity for oil than water. Water leaving the plate separator filters up through the interstices of the coagulator bed while oil collects on the material of the bed forming climbing films which flow upwardly at a lower rate than the water and agglomerate above the bed. As the agglomerates grow they break away and float upwards into a collecting zone where they are collected.

The water leaving the coagulator bed contains oil of molecular fineness which is removed by the screen of the third stage. The oil forms a climbing film on the surface of the vertical or near vertical screen and rises above the screen where it can be collected.

The screen may if necessary be followed by a series of filter cartridges which trap any remaining particles of oil.

A three stage separator for oil and water embodying our invention is illustrated by way of example in the accompanying drawings, in which:-

Figure 1:
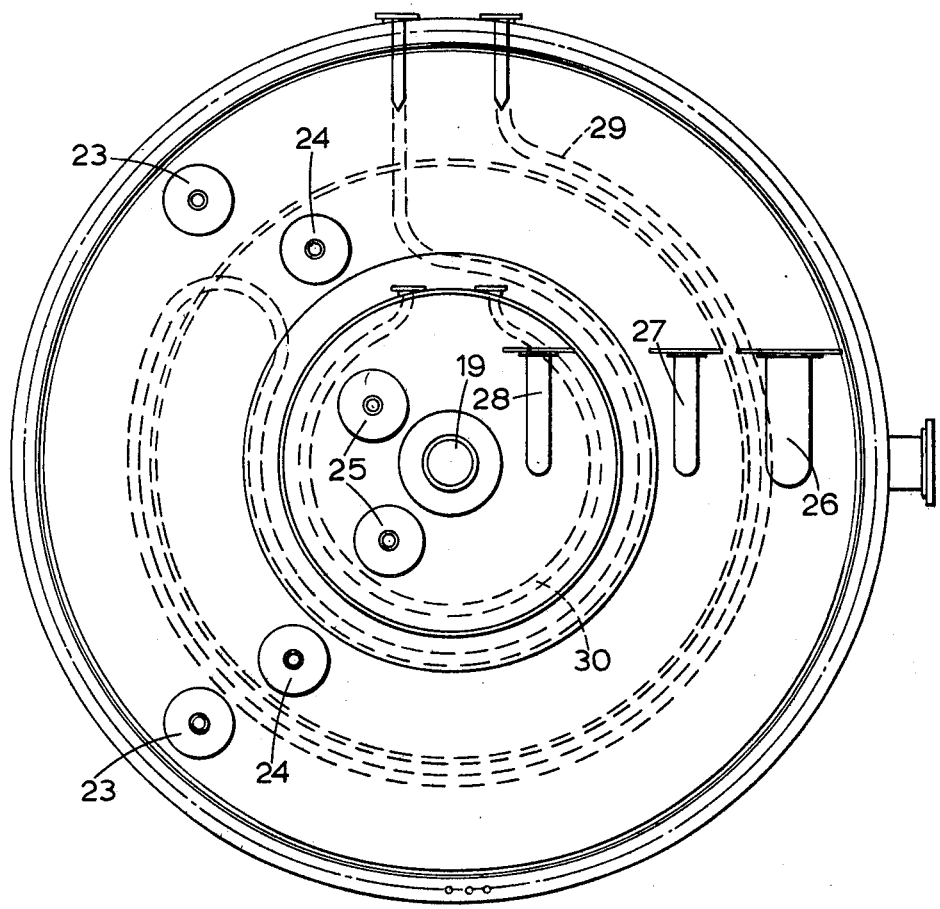
FIG. 1 is a plan of the separator.

The separator illustrated comprises a cylindrical container 1 fabricated from sheet metal, fibre glass or other suitable material, and divided internally by annular partitions into a plurality of annular regions or chambers. The main part of the container is divided horizontally for convenience in manufacture and maintenance, the two sections being connected by a flanged sealed joint 2.

The first stage separator comprises an annular chamber 3 defined by the outer wall of the container and a concentric annular partition 4, the chamber being open at the top and bottom. A mixture of oil and water to be separated enters the container through an inlet 5 below the lower end of the chamber 3. Located in the chamber 3 are three radially spaced concentric cylindrical shells 6 incorporating annular corrugations of waved or shallow Vee form. Each shell thus has a series of vertically spaced upwardly inclined surfaces on which the oil collects, and the oil under the influence of buoyancy climbs up the shells to the upper end of the chamber. The shells are supported at their top and bottom ends by circumferentially spaced bars 7 fixed in and extending radially across the chamber, the ends of the shells being received in notches in the bars to maintain the shells at the correct radial spacing.

The shells may be made of any convenient material, for example, fibreglass or stainless steel. Oil which has collected on the shells and broken away from their upper ends collects in an annular zone 8 from which it can be drawn off.

Water leaving the upper end of the chamber 3 with any oil remaining in it flows downwardly through an annular passage 9 between the partition 4 and a concentric inner partition 10 to the bottom of the container and is directed upwardly through the second stage which comprises a central coagulator bed 11 of substantial depth. The coagulator bed comprises a mass of finely divided material which has a greater affinity for oil than water. The material may, for example, be in granular or fibrous form and may be packed loose in a suitable perforated container or formed into highly porous blocks or mats.

Water filters up through the interstices of the bed while oil collects on the material of the bed and forms climbing films which flow upwardly at a lower rate than the water and agglomerate above the bed. As the agglomerates grow they break away, float upwards and collect in a zone 12 at the upper end of the separator.

Water leaving the coagulator bed flows upwardly and then inwardly through a cylindrical screen 13, a frusto-conical deflector plate 14 being located under the bottom end of the screen to prevent oil leaving the coagulator bed from collecting on the screen and to prevent water from flowing directly to the outlet without passing through the screen.

By this time any oil remaining in the liquid is in very finely divided form and the screen is conveniently of 100 mesh.

Finally, to deal with droplets or particles of say, 10 micron size, filter cartridges 15 are located within the screen and water entering the screen is caused to flow upwardly through these before passing out through a perforated plate 16 at the upper end of the screen. The cartridges are conveniently of cylindrical form with their axes vertical and are made of any suitable material. Such materials may be mats of fibres or filaments, or other porous material such as porous ceramic or sintered material.

Any particles remaining in the water are trapped by the cartridges in which oil may be allowed to accumulate until their oil content is such that they have to be changed.

Alternatively each cartridge may be formed with an axial bore up which oil which has been trapped by the cartridge is carried upwardly to a collecting zone 17 from which it can be drawn off. The collecting zone 17 is located within the domed upper end of an upward extension 18 of the container formed as a cylindrical casing set in the domed upper end of the container.

Clean water leaves by a pipe 19 which passes out of the centre of the upper end of the extension 18. The perforated lower end of the pipe is shielded by a perforated cylindrical shell 21 at the lower end of which is a frusto-conical deflector 22 directly above the upper end of the screen 13.

FIG. 1 indicates at 23, 24 and 25 high and low level probes depending from the top of the container into the various oil collecting zones for indicating the level of oil in these zones.

Outlets for oil from the three collecting zones are shown at 26, 27, 28, oil being drawn off from these outlets when the probes indicate that the oil has reached predetermined levels.

Air eliminators may also be provided to avoid errors in probing to determine the depth of oil in the collecting zones.

FIG. 1 also indicates in dotted lines steam heating coils 29 and 30 through which steam can be circulated through the various stages if the temperature of the liquid to be separated and the viscosity of the oil make that essential or desirable.

The coils 25 are designed to heat the liquid in the first and second stages while the coils 26 heat the liquid in the third stage.

If steam is not available hot water can be circulated through the coils, or the coils may be replaced by electric immersion heaters.

Figure 2:
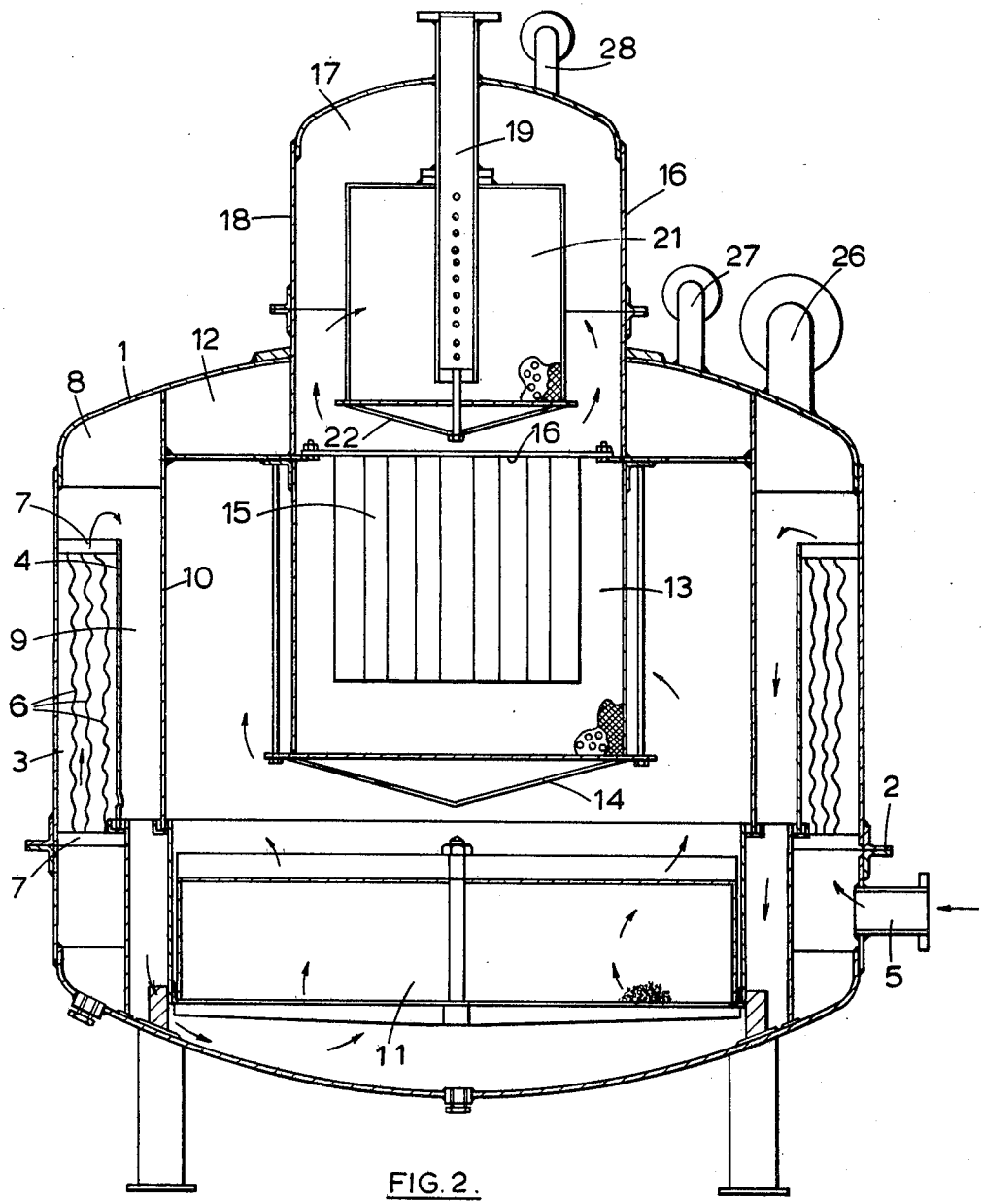
FIG. 2 is a vertical section of the separator.

It will be appreciated from FIG. 2 that the internal annular walls in the separator are divided and incorporate sealed joints in the same horizontal plane as the joint 2 in the wall of the container. Thus it is possible to open the separator without having to lift an outer cover above the internal parts of the separator. Servicing and inspection in confined spaces such as between decks on a ship is greatly faciliated, since the upper portion need only be raised a sufficient distance to split the seals.

I claim:

1. A separator for oil and water in which an oil and water mixture is caused to flow successively through a plurality of separating stages adapted to separate from the water oil particles of progressively decreasing size, wherein the separator comprises a cylindrical vertical container housing the successive separating stages in concentric chambers defined by the wall of the container and internal annular partitions, each chamber having at its upper end a collecting zone for separated oil, a first separating stage comprising a plurality of annular radially spaced shells of which at least portions are inclined to the verticle and which are located in an annular chamber open at the top and bottom between the wall of the container and a concentric partition and means for feeding liquid to be treated to the lower end of said chamber, a second separating stage comprising a coagulator located adjacent to the lower end of said container, means for directing liquid leaving the upper end of said annular chamber of the first stage to the lower end of said coagulator, a third separating stage comprising a filter located within an annular foraminous screen above said coagulator, said screen being in direct communication with the upper end of said coagulator and being fine enough to remove from the water leaving the second stage oil of molecular dimensions, a central chamber in direct communication with the upper end of said filter, means for withdrawing clean water from the upper end of said central chamber above said filter and means for drawing off oil from said collecting zones at the upper ends of said concentric chambers.

2. A separator for oil and water as in claim 1 wherein annular radially spaced shells of the first separating stage incorporate annular corrugations to provide a series of vertically spaced upwardly inclined surfaces on which oil collects, said shells being rigidly supported at their top and bottom ends by notched bars fixed in and extending radially across the top and bottom ends of said annular chamber.

3. A separator for oil and water as in claim 1 wherein said annular screen surrounding said filter forming said third separating stage is closed at its lower end by a frusto-conical deflector plate to prevent oil flowing upwardly from said coagulator from collecting on said screen.

4. A separator for oil and water as in claim 1 wherein said filter comprises a plurality of vertically disposed cylindrical filter cartridges.

5. A separator for oil and water as in claim 1 wherein said oil collecting zone for oil flowing upwardly from said screen is formed by an upward extension of said central chamber, said means for withdrawing clean water comprising a perforated pipe depending into said extension within a shield comprising a perforated cylindrical shell directly above said screen and closed at its lower end by a frusto-conical deflector.

* * * * *